(12) United States Patent
Wu et al.

(10) Patent No.: US 10,365,395 B2
(45) Date of Patent: Jul. 30, 2019

(54) MULTI-COMPONENT INDUCTION LOGGING SYSTEMS AND METHODS USING BLENDED-MODEL INVERSION

(71) Applicant: HALLIBURTON ENERGY SERVICES, INC., Houston, TX (US)

(72) Inventors: Dagang Wu, Katy, TX (US); Junsheng Hou, Kingwood, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/787,256

(22) PCT Filed: Mar. 11, 2014

(86) PCT No.: PCT/US2014/023095
§ 371 (c)(1),
(2) Date: Oct. 26, 2015

(87) PCT Pub. No.: WO2015/137921
PCT Pub. Date: Sep. 17, 2015

(65) Prior Publication Data
US 2016/0109614 A1 Apr. 21, 2016

(51) Int. Cl.
*G01V 3/38* (2006.01)
*G01V 3/28* (2006.01)

(52) U.S. Cl.
CPC . *G01V 3/38* (2013.01); *G01V 3/28* (2013.01)

(58) Field of Classification Search
CPC .......... G01V 3/28; G01V 3/18; G01V 11/002; G01V 3/108; G01V 3/26; G01V 1/48;
(Continued)

(56) References Cited

U.S. PATENT DOCUMENTS 4,302,723 A * 11/1981 Moran .................. G01V 3/28
324/343
5,867,806 A 2/1999 Strickland et al.
(Continued)

FOREIGN PATENT DOCUMENTS

WO 2008/115229 9/2008
WO 2013/015789 1/2013
(Continued)

OTHER PUBLICATIONS

PCT International Search Report and Written Opinion, dated Dec. 15, 2014, Appl No. PCT/US2014/023095, "Multi-Component Induction Logging Systems and Methods Using Blended-Model Inversion," Filed Mar. 11, 2014, 11 pgs.
(Continued)

*Primary Examiner* — Stephanie E Bloss
*Assistant Examiner* — Lisa E Peters
(74) *Attorney, Agent, or Firm* — Benjamin Fite; C. Tumey Law Group PLLC

(57) ABSTRACT

At least some disclosed resistivity logging system embodiments include a logging tool and a processing system. The logging tool provides multi-component transmitter-receiver coupling measurements to the processing system. The processing system derives from the measurements initial formation parameter estimates based on a first formation model such as a radially-symmetric formation model having anisotropic, but otherwise homogenous dipping formation. The processing system further derives in one or more selected regions a second set of formation parameter estimates based on a second formation model such as a model having a dipping borehole through a series of horizontal formation layers, each having a vertical transverse isotropy. The processing system produces an output set of formation parameter estimates which, in the selected regions, depend on the
(Continued)

second set of formation parameter estimates, and in at least some regions outside the selected regions, solely depend on the initial formation parameter estimates.

21 Claims, 7 Drawing Sheets

(58) Field of Classification Search
CPC .. G01V 3/10; G01V 3/38; E21B 49/00; E21B 47/026; E21B 47/12; E21B 47/00
See application file for complete search history.

(56) References Cited

U.S. PATENT DOCUMENTS

| | | |
|---|---|---|
| 5,886,526 A | 3/1999 | Wu |
| 6,098,019 A | 8/2000 | Hakvoort et al. |
| 6,163,155 A | 12/2000 | Bittar |
| 6,466,872 B1 | 10/2002 | Kriegshauser et al. |
| 6,819,111 B2 | 11/2004 | Fanini et al. |
| 6,819,112 B2 | 11/2004 | Gianzero et al. |
| 6,885,943 B2 | 4/2005 | Bittar et al. |
| 6,950,749 B2 | 9/2005 | Frenkel et al. |
| 6,998,844 B2 | 2/2006 | Omeragic et al. |
| 7,313,479 B2 | 12/2007 | Frenkel et al. |
| 7,382,135 B2 | 6/2008 | Li et al. |
| 7,463,035 B2 | 12/2008 | Merchant et al. |
| 7,496,451 B2 | 2/2009 | Fang et al. |
| 7,599,825 B2 | 10/2009 | Yang et al. |
| 7,659,722 B2 | 2/2010 | Bittar |
| 7,952,358 B2 | 5/2011 | Wang |
| 7,990,153 B2 | 8/2011 | Streinz et al. |
| 8,274,289 B2 | 9/2012 | Bittar et al. |
| 8,433,518 B2 | 4/2013 | Omeragic et al. |
| 2003/0093223 A1 | 5/2003 | Zhang et al. |
| 2003/0146752 A1* | 8/2003 | Gianzero ................ G01V 3/28 324/343 |
| 2005/0030021 A1* | 2/2005 | Prammer ............. G01N 24/081 324/303 |
| 2005/0083061 A1 | 4/2005 | Tabanou et al. |
| 2005/0257960 A1* | 11/2005 | McGregor .............. E21B 49/10 175/24 |
| 2010/0156424 A1 | 6/2010 | Bittar et al. |
| 2010/0230095 A1 | 9/2010 | Yin |
| 2011/0098929 A1* | 4/2011 | Tabanou ................ G01V 3/083 702/7 |
| 2013/0046474 A1 | 2/2013 | Bittar et al. |
| 2013/0105224 A1 | 5/2013 | Donderici et al. |

FOREIGN PATENT DOCUMENTS

| | | |
|---|---|---|
| WO | 2013/036509 | 3/2013 |
| WO | 2013/066297 | 5/2013 |
| WO | 2014/011190 | 1/2014 |
| WO | 2015/137921 | 9/2015 |
| WO | 2016/099504 | 6/2016 |

OTHER PUBLICATIONS

PCT International Search Report and Written Opinion, dated Sep. 8, 2015, Appl No. PCT/US2014/071101, "Shoulder Effect Reduction," Filed Dec. 18, 2014, 15 pgs.

Bittar, Michael, "New Tool Optimizes Wellbore Placement", Exploration & Production Magazine, Jul. 31, 2007, p. 1-4, Hart Energy, Houston, Texas, United States, Available at: http://www.epmag.com/EP-Magazine/archive/New-tool-optimizes-wellbore-placement_537.

Dautel, Mike et al., "Modern Azimuthal Resistivity Tools and Their Application to Mature Field Development," SPWLA-India 3rd Annual Logging Symposium Mumbai, India, Nov. 2011, p. 1-14, Society of Petrophysicists and Well Log Analysts, Houston, Texas, United States.

Li, Qiming et al., "New Directional Electromagnetic Tool for Proactive Geosteering and Accurate Formation Evaluation While Drilling," SPWLA 46th Annual Logging Symposium Conference Paper, Jun. 2005, p. 1-16, Society of Petrophysicists and Well Log Analysts, Houston, Texas, United States, Available at: https://www.onepetro.org/conference-paper/SPWLA-2005-F.

Moran, J. H. et al., "Effects of Formation Anisotropy of Resistivity-Logging Measurements", Geophysics, vol. 44, No. 7, (Jul. 1979), p. 1266-1286, 21 Figs., 4 Tables.

Zhang, Zhiyi et al., "Petrophysical Inversion of Resistivity Logging Data", SPE Annual Technical Conference and Exhibition, Conference Paper, Oct. 2000, p. 1-3, Society of Petroleum Engineers, Houston, Texas, United States, Available at: https://www.onepetro.org/conference-paper/SPE-63285-MS.

* cited by examiner

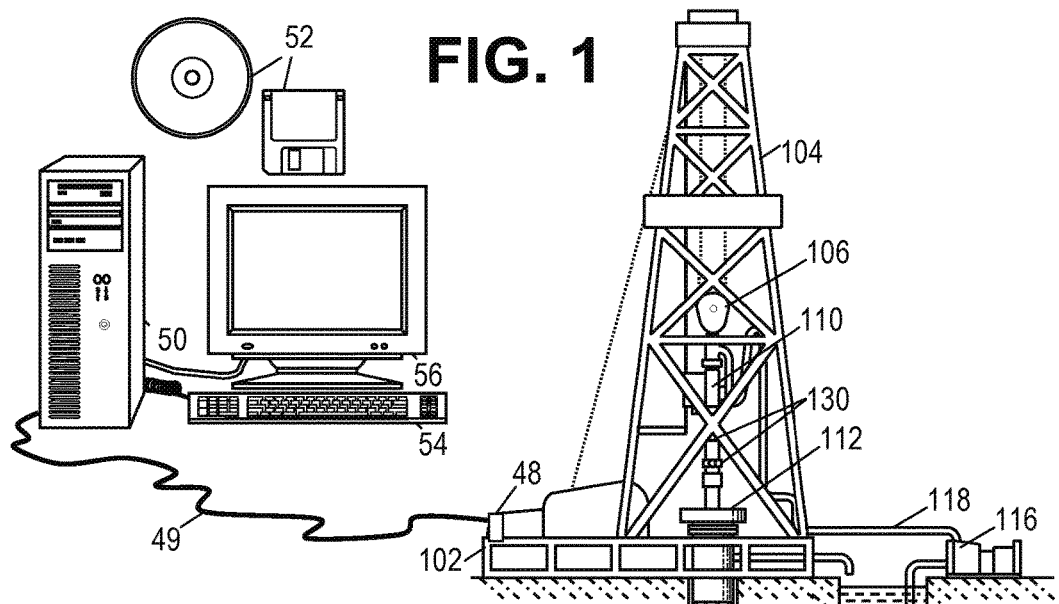
FIG. 1
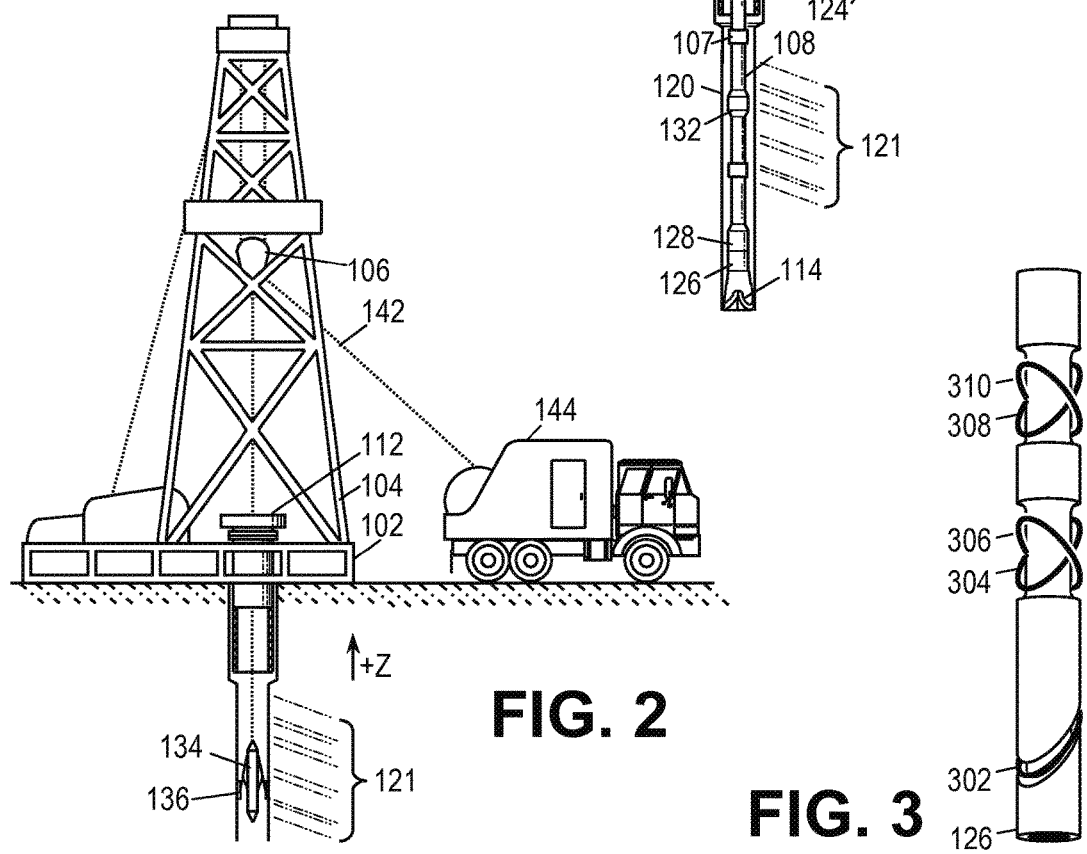
FIG. 2
FIG. 3

FIG. 5
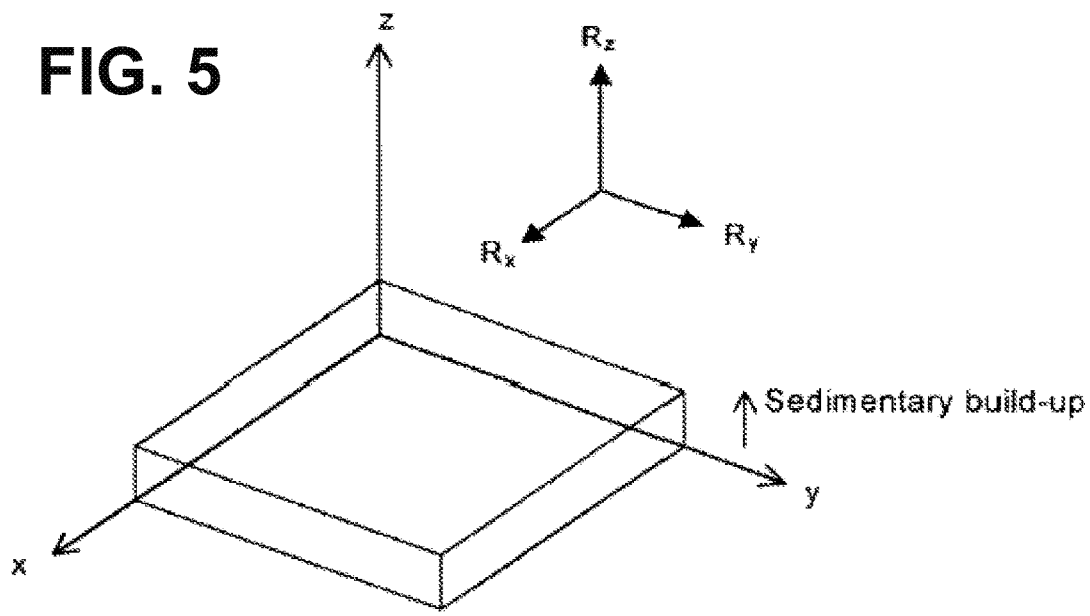
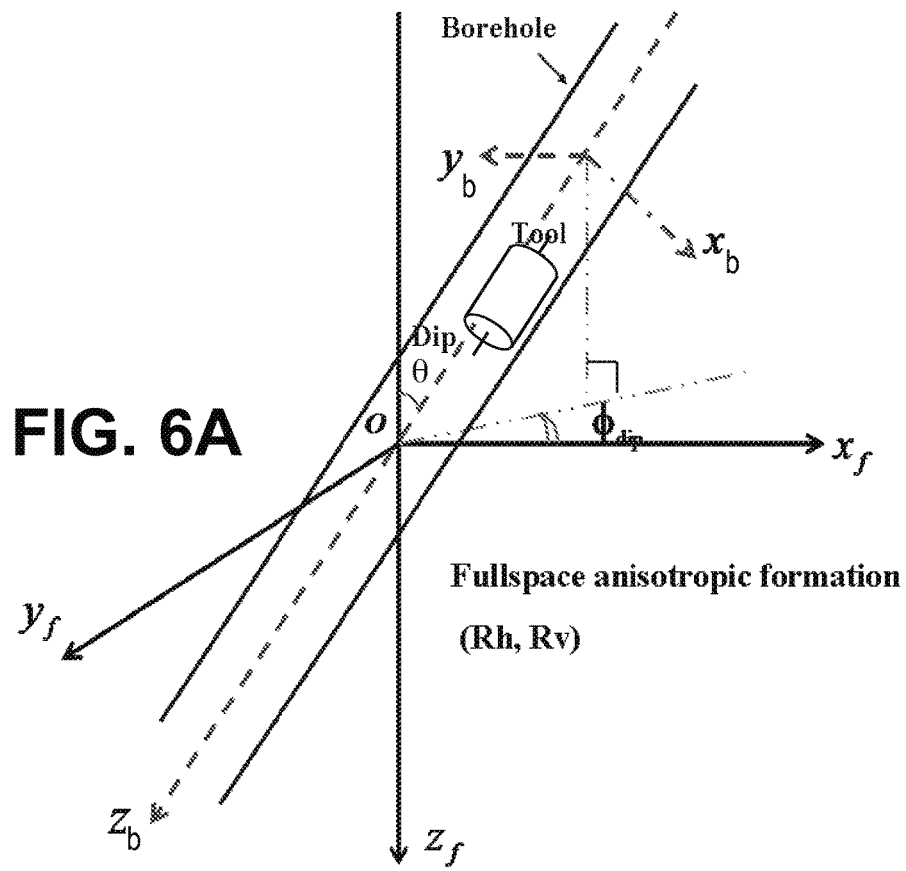
FIG. 6A

FIG. 6B
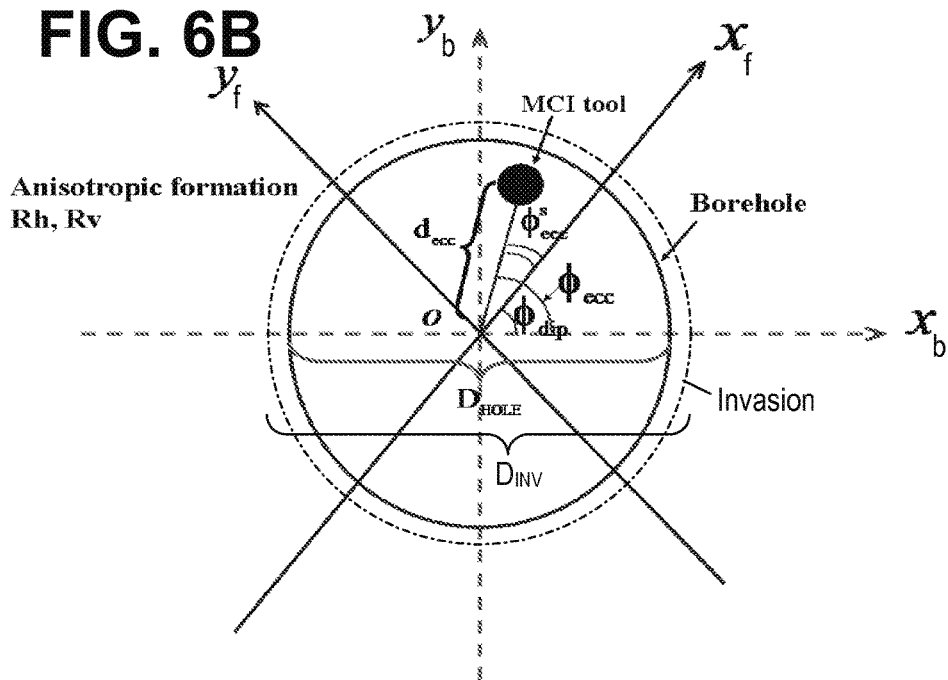
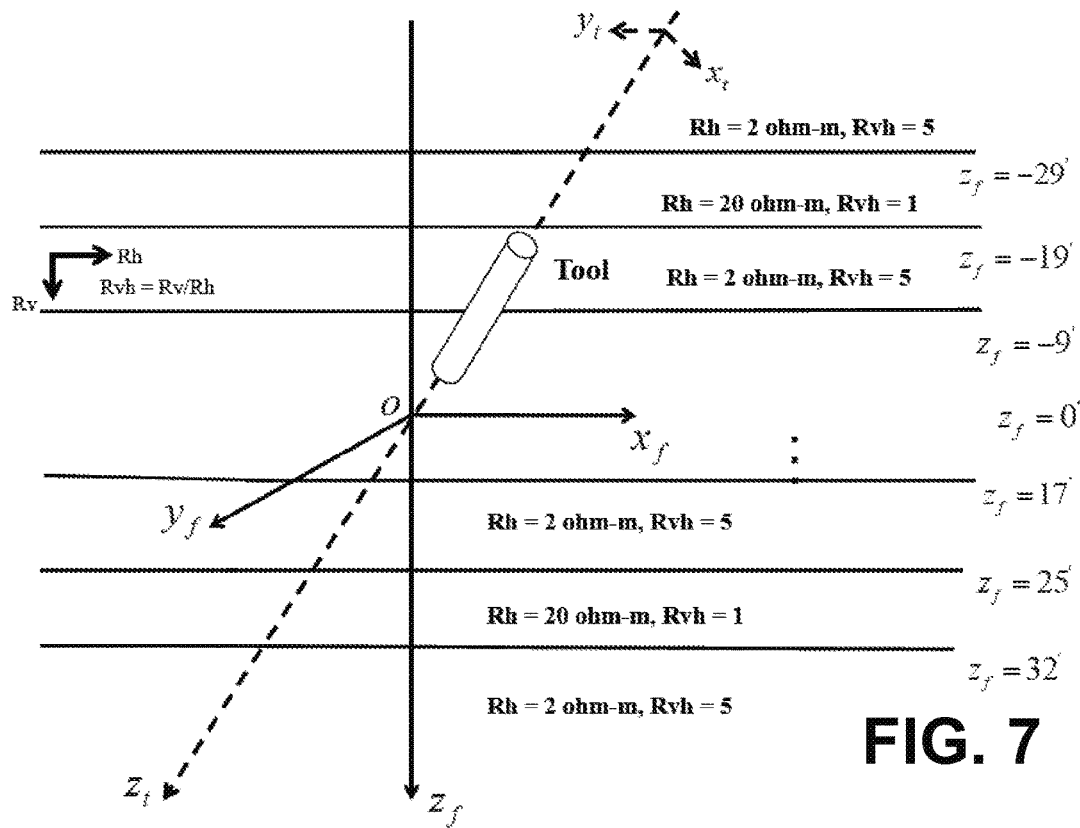
FIG. 7

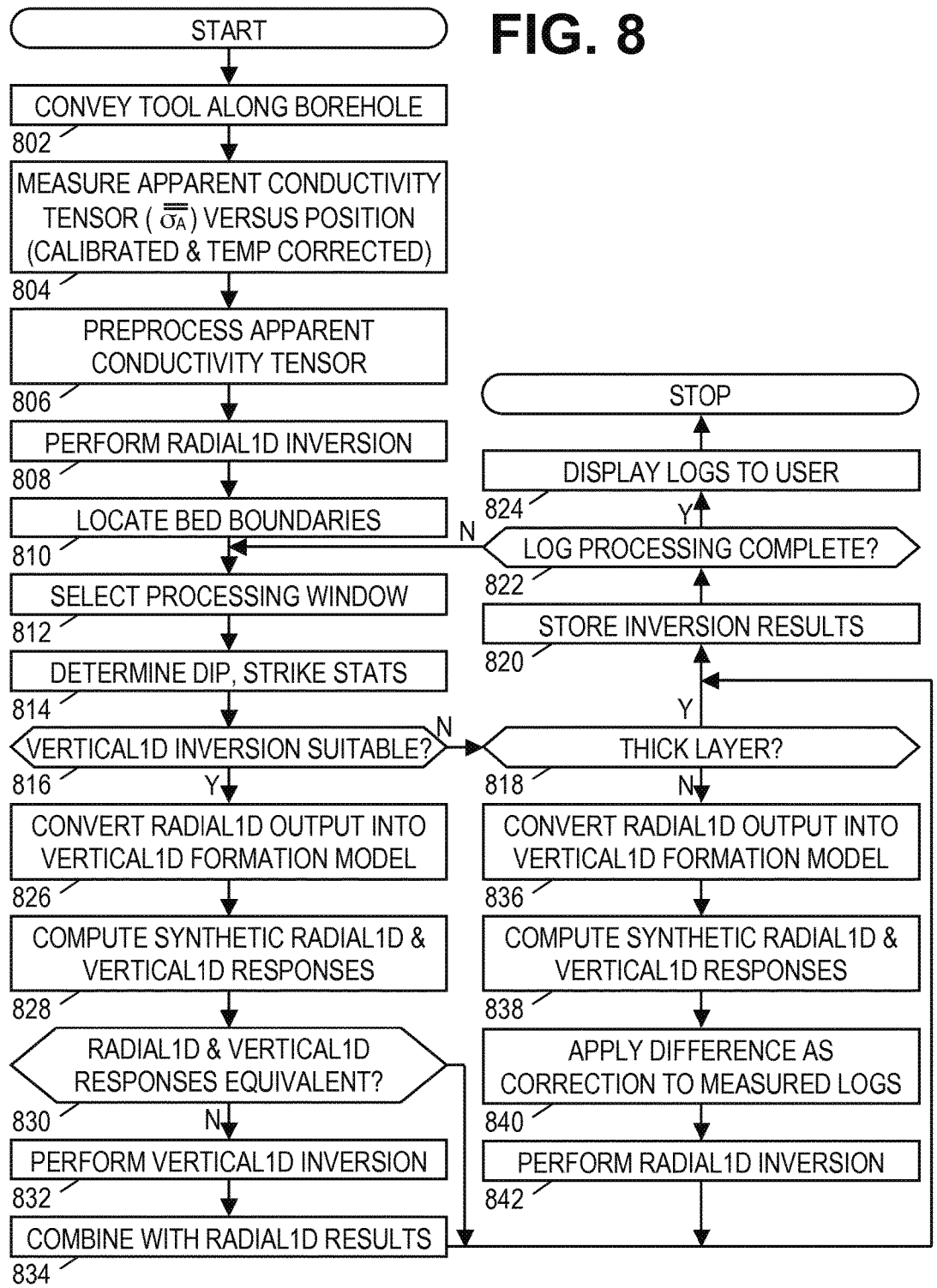

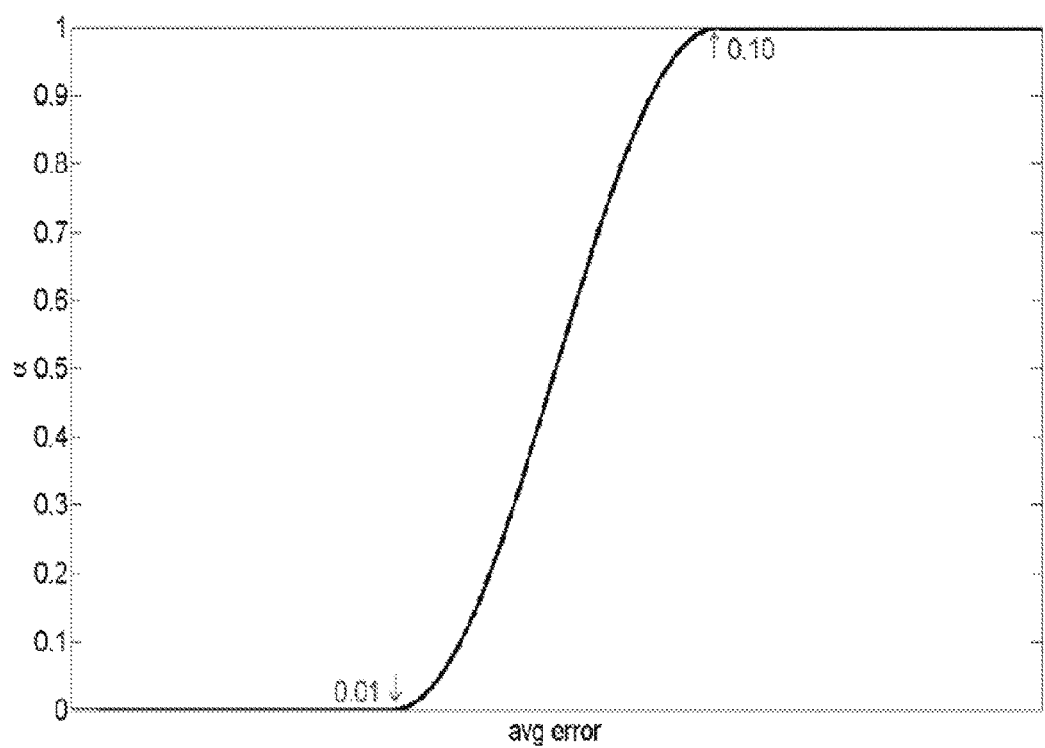

PROCESSING SYSTEM
900

- DERIVE, FROM MULTI-COMPONENT TRANSMITTER-RECEIVER COUPLING MEASUREMENTS OBTAINED BY A LOGGING TOOL CONVEYED ALONG A BOREHOLE THROUGH A FORMATION, A FIRST SET OF ONE OR MORE FORMATION PARAMETER ESTIMATES BASED ON A FIRST FORMATION MODEL
- DERIVE IN ONE OR MORE SELECTED REGIONS A SECOND SET OF ONE OR MORE FORMATION PARAMETER ESTIMATES BASED ON A SECOND FORMATION MODEL DIFFERENT FROM THE FIRST FORMATION MODEL
- PRODUCE A THIRD SET OF ONE OR MORE FORMATION PARAMETER ESTIMATES BASED AT LEAST IN PART ON THE FIRST AND SECOND SETS, EACH FORMATION PARAMETER ESTIMATE IN THE FIRST, SECOND, AND THIRD SETS BEING DETERMINED AS A FUNCTION OF POSITION ALONG THE BOREHOLE
- DISPLAY A VISUAL REPRESENTATION OF AT LEAST ONE FORMATION PARAMETER ESTIMATE FROM THE THIRD SET,
    WHEREIN EACH FORMATION PARAMETER ESTIMATE IN THE THIRD SET DEPENDS ON A CORRESPONDING FORMATION PARAMETER ESTIMATE FROM THE SECOND SET IN THE ONE OR MORE SELECTED REGIONS, AND
    WHEREIN EACH FORMATION PARAMETER ESTIMATE IN THE THIRD SET DEPENDS ONLY ON A CORRESPONDING FORMATION PARAMETER ESTIMATE FROM THE FIRST SET IN ONE OR MORE REGIONS OUTSIDE THE ONE OR MORE SELECTED REGIONS

FIG. 10

MULTI-COMPONENT INDUCTION LOGGING SYSTEMS AND METHODS USING BLENDED-MODEL INVERSION

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical resistivity logging tool includes a transmitter antenna and a pair of receiver antennas located at different distances from the transmitter antenna along the axis of the tool. The transmitter antenna is used to create electromagnetic fields in the surrounding formation. In turn, the electromagnetic fields in the formation induce an electrical voltage in each receiver antenna. Due to geometric spreading and absorption by the surrounding earth formation, the induced voltages in the two receiving antennas have different phases and amplitudes. Experiments have shown that the phase difference (D) and amplitude ratio (attenuation, A) of the induced voltages in the receiver antennas are indicative of the resistivity of the formation. The average depth of investigation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta=[R_v/R_h]^{1/2}$.

The relative dip angle, $\theta$, is the angle between the tool axis and the normal to the plane of the formation. Resistive anisotropy and relative dip angle each have significant effects on resistivity logging tool measurements. As a result, resistivity logging systems should account for formation anisotropy and relative dip if accurate resistivity logs are to be obtained. In U.S. Pat. No. 6,163,155 ("Electromagnetic wave resistivity tool having a tilted antenna for determining the horizontal and vertical resistivities and relative dip angle in anisotropic earth formations"), Michael Bittar discloses one such approach that employs resistivity logging tools having tilted transmitter and/or receiver antennas.

Often, an inversion process is employed to derive the formation parameters from the resistivity tool measurements. In an inversion process, the tool measurements are compared to synthetic measurements derived from a parameterized formation model, and the model parameters are adjusted until a match is achieved. The most useful models strike a balance between simplicity and accuracy. Accurate inversions generally require some minimum level of complexity that renders their use infeasible in at least some situations (e.g., real time monitoring, embedded systems). Simpler models may provide significantly reduced computational demands at the cost of accuracy.

BRIEF DESCRIPTION OF THE DRAWINGS

Accordingly, there are disclosed in the drawings and the following description specific multi-component induction (MCI) logging systems and methods that employ blended-model inversions to provide sufficient inversion accuracy without any unwarranted increases in computational complexity. In the drawings:

FIG. 1 shows an illustrative logging while drilling environment with dipping formation beds.

FIG. 2 shows an illustrative wireline logging environment with dipping formation beds.

FIG. 3 shows an illustrative antenna configuration for a LWD MCI logging tool.

FIG. 5 is a schematic perspective view of a Cartesian coordinate system in a sedimentary earth formation.

FIGS. 6A-6B show parameters of an illustrative radial model for inversion.

FIG. 7 shows parameters of an illustrative vertical model for inversion.

FIG. 8 is a flow diagram of an illustrative inversion method employing a blended model approach.

FIG. 9 is a graph of an illustrative transition function.

FIG. 10 is a block diagram of an illustrative processing system.

Figure 4A:
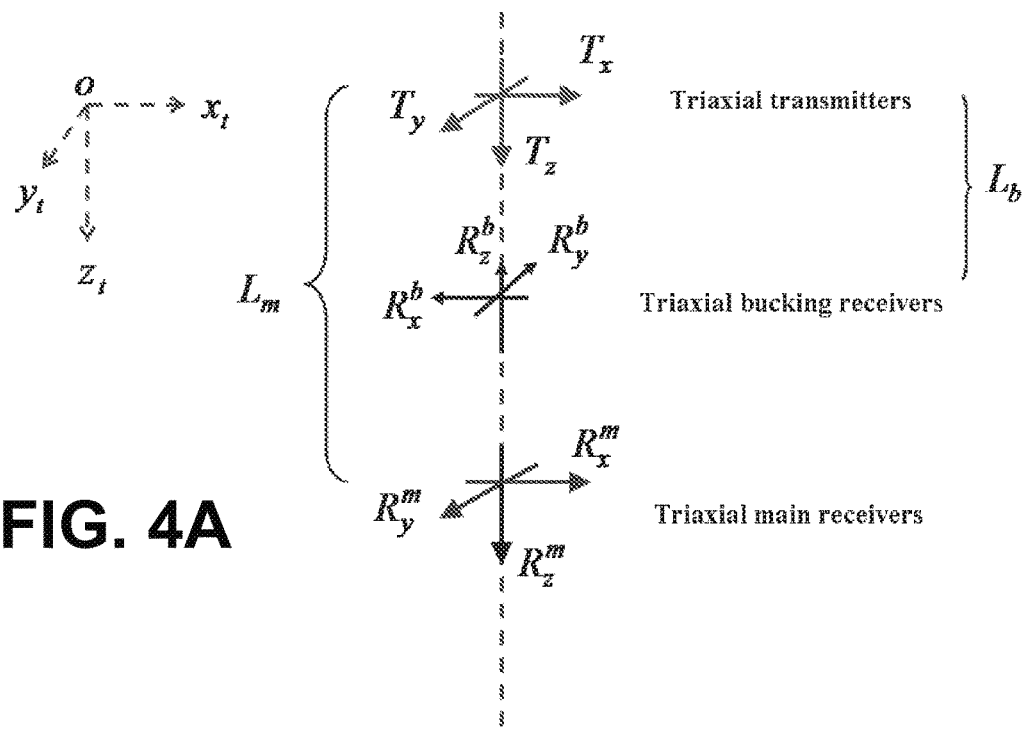
FIG. 4A shows an illustrative antenna configuration for a wireline MCI logging tool.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The following disclosure provides a rigorous approach for efficient and accurate estimation of formation properties from measurements obtained by multi-component array induction tools. For many regions, the use of a fast, radial model-based inversion suffices. Where indications of a significant shoulder effect are present, a vertical model may be employed for a shoulder-effect correction or a slower, more accurate, inversion. A disclosed sliding-window processing approach enables an efficient implementation of the blended-model inversion.

FIG. 1 shows a suitable context for describing the operation of the disclosed systems and methods. In the illustrated logging while drilling (LWD) environment, a drilling platform 102 is equipped with a derrick 104 that supports a hoist 106 for raising and lowering a drill string 108. The hoist 106 suspends a top drive 110 that rotates the drill string 108 as the drill string is lowered through the well head 112. The drill string 108 can be extended by temporarily anchoring the drill string 108 at the well head 112 and using the hoist 106 to position and attach new drill pipe sections with threaded connectors 107.

Connected to the lower end of the drill string 108 is a drill bit 114. As the drill bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

Drilling fluid, often referred to in the industry as "mud", is often categorized as either water-based or oil-based, depending on the solvent. Oil-based muds are generally preferred for drilling through shaley formations, as water-based muds have been known to damage such formations.

A multi-component induction (MCI) logging tool 126 is integrated into the bottom-hole assembly near the drill bit 114. The MCI logging tool 126 may take the form of a drill collar, i.e., a thick-walled tubular that provides weight and rigidity to aid the drilling process. As the drill bit 114 extends the borehole 120 through the formations, the bottomhole assembly (BHA, including the MCI logging tool 126 and a telemetry module 128) collects multi-component induction measurements (with the MCI logging tool 126) as well as measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the orientation indicator includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, multi-component induction logging tools disclosed herein can be used to steer the bit to the desirable bed.

In wells employing acoustic (as an example) telemetry for LWD, downhole sensors (including multi-component induction logging tool 126) are coupled to the telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the bottomhole assembly 129, thereby enabling adjustment of the tool's configuration and operating parameters. In some embodiments, the telemetry module 128 also or alternatively stores measurements for later retrieval when the bottomhole assembly 129 returns to the surface.

A drilling equipment interface 48 facilitates communication between the surface components of the telemetry system and a processing system 50, shown here in the form of a desktop computer coupled to the drilling equipment interface 48 via a cable 49. In other embodiments, the processing system 50 may be a tablet, laptop computer, a remote processing center, or even a virtual computer, any of which may be coupled to retrieve the logging tool measurements via a computer network and/or a wireless communications link. Software (shown in FIG. 1 as portable information storage media 52), once loaded into internal memory and executed by the processor(s), configures the processing system 50 to derive estimated formation parameters from the logging tool measurements and to responsively provide a visual representation of the estimated parameters on a display 56, a printer, or other device for providing a perceptible output. A keyboard 54 or other input device enables a user to interact with the processing system and thereby achieve at least some control of the displayed information to facilitate a greater understanding of the presented information. Normally the formation parameter estimates are presented as formation logs having multiple tracks each displaying a formation parameter's dependence on depth or borehole position.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A multi-component induction logging portion of the logging tool 134 may have centralizing arms 136 that center the tool within the borehole as the tool is pulled uphole. A logging facility 144 collects measurements from the logging tool 134, and includes a processing system 50 for processing and storing the measurements gathered by the logging tool.

FIG. 3 shows an illustrative MCI logging while drilling (MWD) tool 126 having antennas for acquiring multi-component induction logging measurements. Logging tool 126 has a tilted transmit antenna 302 and two pairs of tilted receive antennas 304, 306 and 308, 310, thereby providing four transmit-receive antenna pairings. As the tool rotates, it acquires attenuation and phase measurements of each receive antenna's (304, 306, 308, 310) response to transmit antenna 302. In certain alternative embodiments, the tool measures in-phase and quadrature-phase components of the receive signals rather than measuring amplitude and phase. In either case, these measurements are collected and stored as a function of the tool's position and rotational orientation in the borehole.

The illustrated tool has receive antennas 304 and 308 oriented parallel to the transmit antenna 302, and receive antennas 306 and 310 oriented perpendicular to the transmit antenna. In the illustrated example, each of the antennas share a common rotational orientation, with antennas 302, 304, 308 being tilted at −45° and antennas 306, 310 being tilted at +45° relative to the longitudinal tool axis. In the illustrative tool embodiments, each of the coil antennas surrounding the tool is mounted in a recess and protected by a non-conductive filler material and/or a shield having non-conducting apertures. The tool body is primarily composed of a highly conductive material, such as steel. The relative tool dimensions and antenna spacings are subject to a great deal of variation depending on the desired tool properties. The distance between the receive coil pairs may be on the order of 0.25 m, while the spacing of the transmit coil to the midpoint between the receiver pairs may vary from about 0.4 m to over 10 m.

As disclosed in U.S. patent application Ser. No. 12/294,557 "Antenna Coupling Component Measurement Tool . . .

Figure 4B:
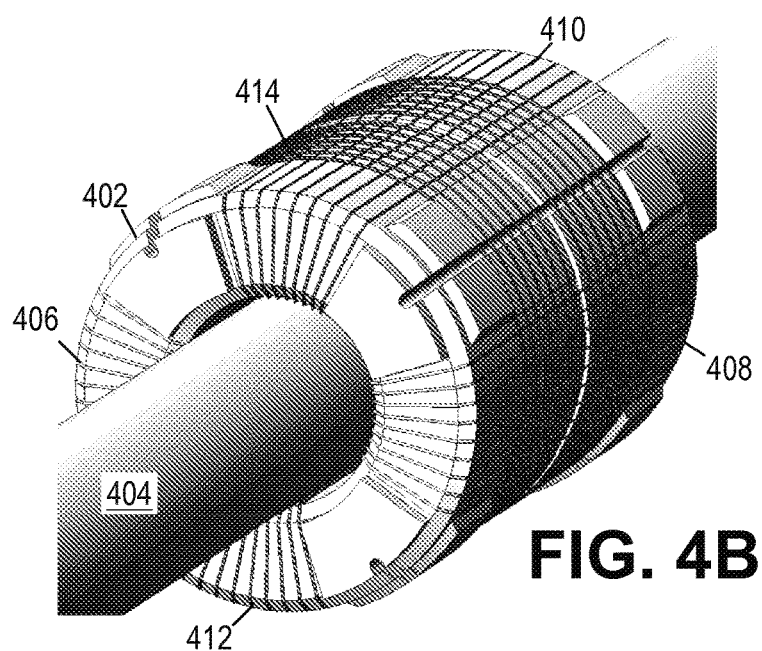
FIG. 4B shows an illustrative physical subarray model of an MCI logging tool suitable for defining a measured conductivity tensor.

" filed Sep. 25, 2008 by inventors Michael Bittar and David Hu, the measurements taken by a tool of this kind as it rotates enable a full set of orthogonal coupling component measurements to be obtained at each point along the borehole axis. The orthogonal coupling component measurements correspond to the tool model shown in FIG. 4A. A triad of transmitters $T_x$, $T_y$, $T_z$, represent magnetic dipole antennas oriented parallel to the tool's x, y, and z axes respectively. A triad of main receivers $R_x^m$, $R_y^m$, $R_z^m$ similarly represent magnetic dipole antennas oriented along these axes, as do a triad of bucking receivers $R_x^b$, $R_y^b$, $R_z^b$. As shown in FIG. 4B, the corresponding antenna triads for a wireline tool might each be wound on a winding form 402 around an inner tubular 404 for housing electronics and wiring. Sensitivity to magnetic fields along an X-axis could be provided by two coils 406, 408, while sensitivity along a Y-axis could similarly be provided by two coils 410, 412. A co-axial coil 414 could provide sensitivity along a Z-axis.

Returning to FIG. 4A, the main receiver triad is spaced at a distance $L_m$ from the transmitter triad, and the bucking receiver triad is spaced at a distance $L_b$ from the transmitter triad. The signal measurements of the bucking receiver triad can be subtracted from the main receiver triad to eliminate the direct signal from the transmitter and increase sensitivity to formation properties. As explained by Moran and Gianzero, in "Effects of Formation Anisotropy on Resistivity Logging Measurements" Geophysics, Vol. 44, No. 7, p. 1266 (1979), the magnetic field h in the receiver coils with a given signal frequency can be represented in terms of the magnetic moments m at the transmitters and a coupling matrix C:

$$h = Cm \quad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \quad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 4B, if each transmitter is fired in turn, and signal measurements are made at each receiver in response to each firing, nine differential measurements ($R^m - R^b$) are obtained. These nine frequency-dependent measurements enable the determination of a complete coupling matrix C. ($C_{IJ} = a_{IJ} V^{IJ}$, where I is the index for receiver axis x, y, z, and J is the index for transmitter axis x, y, z, $a_{IJ}$ is a constant determined by the tool design, and $V_{IJ}$ is a complex value representing the signal amplitude and phase shift measured by receiver I in response to the firing of transmitter J.) Thus the measured voltage tensor can be expressed:

$$\overline{V} = (V_{ij})_{(3 \times 3)} = \begin{pmatrix} V_{xx} & V_{xy} & V_{xz} \\ V_{yx} & V_{yy} & V_{yz} \\ V_{zx} & V_{zy} & V_{zz} \end{pmatrix}. \quad (3)$$

As in conventional induction logging, the elements of the measured voltage tensor can be calibrated into an apparent conductivities to obtain the following apparent-conductivity tensor expression:

$$\overline{\sigma_a} = (\sigma_{ij})_{(3 \times 3)} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix}. \quad (4)$$

As with the coupling matrix elements, the apparent conductivities are each related to the corresponding measured voltage tensor elements via a calibration factor $K_{ij}$:

$$\sigma_{ij} = K_{ij} V_{ij}, \quad (5)$$

where $K_{ij}$ are the calibration factors as determined by a calibration experiment. With a tool design that employs collocated transmit antennas and collocated receive antennas, the calibration factors for a given transmit-receive antenna subarray usually satisfy the following relations:

$$K_{xx} = K_{yy} = K_{xy} = K_{yx} \quad (6a)$$

$$K_{xz} = K_{yz} = K_{zx} = K_{zy} \quad (6b)$$

yielding only three independent calibration factors per frequency: $K_{xx}$, $K_{zz}$, and $K_{xz}$. Calibration may be done in such a way that the conductivity reading of the tool in homogeneous formation without the borehole would be the conductivity of the formation.

Any of the tensors from equations (2)-(4) can be taken as a starting point for the processing operation that yields an estimate of the desired formation properties in the vicinity of the tool, including vertical and horizontal resistivity.

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 5. FIG. 5 shows a portion of a sedimentary formation bed, with the z-axis oriented perpendicular to the plane of the formation, i.e., in the direction of the sedimentary accretion. As previously mentioned, the formation resistivity when measured along this axis is often different than formation resistivity measured in the x-y plane. In a dipping bed, the x-axis may be chosen to be oriented in the direction of deepest ascent, i.e., "uphill or downhill". In a horizontal bed, the x-axis may be chosen to be oriented north.

In addition to the tool coordinate system and the formation coordinate system, a third coordinate system is employed herein. The borehole coordinate system has a z-axis that follows the central axis of the borehole. The x-axis of the borehole extends perpendicularly from the central axis through the low side of the borehole. (In a vertical borehole, the x-axis extends through the north side of the borehole.) The y-axis extends perpendicular to the other two axes in accordance with the right-hand rule. The borehole coordinate system is related to the tool coordinate system in that their z-axes are aligned (though possibly offset), and the orientation sensors measure the rotation of the tool's x- and y-axes relative to those of the borehole, enabling the coupling measurements to be calculated in terms of the borehole's coordinate system.

With these coordinate systems in mind, FIGS. 6A-6B show parameters of an illustrative "radial" formation model suitable for use in estimating formation parameters of interest. As explained in greater detail below, this radial formation model may assume the role of a first formation model from which a first set of formation parameter estimates is obtained. The illustrated model assumes an infinite, homogeneous formation having a vertical transverse isotropic (VTI) resistivity, i.e., resistively anisotropic with a horizontal resistivity Rh and a vertical resistivity Rv. A borehole through the formation has a central axis that crosses through the origin of the formation coordinate system. The angle θ between the borehole's z-axis and the formation's z-axis is the dip angle. The angle φ between the formation's x-axis and the projection of the borehole's z-axis on the horizontal plane is the dip azimuth, or "strike" angle. FIG. 6B is a cross-section of the borehole taken perpendicular to the central axis. The multi-component induction tool is shown displaced from the borehole's central axis by an eccentricity distance $d_{ecc}$ in the direction of an eccentricity azimuth $\phi_{ecc}$. Two such azimuths eccentricity are shown, with one ($\phi_{ecc}$) measured relative to the borehole x-axis, and a second, strike offset eccentricity azimuth $\phi^s_{ecc}$ measured relative to the formation x-axis. The borehole diameter $D_{hole}$ and the invasion region diameter $D_{inv}$ are also shown. (The invaded region is a region around the borehole where the borehole fluid has altered the resistivity from that of the native formation.) The radial model assumes no variation along the borehole z-axis, and the only asymmetries are the tool eccentricity and resistive anisotropy of the formation.

In summary, the radial model assumes concentric cylinders of resistivity, with an allowance for a tool eccentricity. The cylinders may correspond to the tool body, the borehole, the invaded region, and the surrounding formation. Some embodiments may omit the cylinder representing the invaded region, or include additional cylinders to model variation within the invaded region. An illustrative set of formation parameters that may be estimated using the radial formation model includes formation dip θ, dip azimuth $\phi_{dip}$, horizontal resistivity $R_h$, and vertical resistivity $R_v$, and may further include tool eccentricity $d_{ecc}$, eccentricity azimuth $\phi_{ecc}$ or $\phi^s_{ecc}$, borehole diameter $D_{hole}$, borehole fluid resistivity $R_{hole}$, invaded region diameter $D_{inv}$, invaded region resistivity $R_{inv}$.

To contrast with the radial formation model, FIG. 7 shows a vertical formation model which increases the level of complexity by providing for horizontal formation bedding layers having respective resistivities. As explained in greater detail below, this vertical formation model may assume the role of a second formation model that is different from the first formation model and which may be used to obtain a second set of formation parameter estimates. Usually, in such vertical formation models, the existence of the borehole is neglected because borehole effects on tool response are removed or significantly reduced by appropriate processing. For illustrative purposes, FIG. 7 shows a vertical formation model with specific bed boundary locations and specific horizontal and vertical resistivity values for each bed. Because the number of bedding layers can get quite large, a preferred processing approach employs a sliding window. The sliding window enables the processing system to consider only a small number of layers on either side of the current layer of interest, treating everything beyond the window as a uniform background. Some implementations consider only one layer on either side of the current layer, for a window width of three layers. Other implementations consider two layers on either side of the current layer, for a window width of five layers. Greater window widths are possible, though the greater number of model parameters increases the computational burden associated with the inversion process. An illustrative set of formation parameters that may be estimated using the vertical formation model includes formation dip θ, dip azimuth $\phi_{dip}$, horizontal resistivity $R_h$, and vertical resistivity $R_v$, and may further include bed boundary positions.

The illustrated formation models are just examples of the many formation models available in the literature and employed in commercially-available software for processing multi-component induction tool logs. In practice, the actual formations are not radially symmetric or comprised of perfectly planar, parallel layers. Such approximations achieve a great computational savings over a full three-dimensional formation model while still yielding reasonably accurate estimates in suitable circumstances. However, if the formation dip and strike are changing too quickly, the vertical formation model becomes a poor approximation that fails to yield accurate results. Moreover, even the vertical formation model still imposes a significant computational burden relative to other available formation models like the radial formation model. Of course, the relative simplicity of the radial formation model means that its performance suffers in the presence of shoulder-bed effects (i.e., vertical variation).

Accordingly, FIG. 8 is a flow chart of an illustrative logging method that switches between formation models as needed during the inversion to thereby avoid incurring any unnecessary computational penalties without sacrificing the increased accuracy achievable by appropriate application of the more complex formation models. The illustrated processing method may be implemented by the systems illustrated in FIGS. 1 and 2. Alternatively, systems such as those illustrated in FIGS. 1-2 may acquire the data and communicate it to a remote workstation where the remaining portion of the illustrative method is carried out.

The logging method begins in block 802 with the conveyance of a multi-component induction logging tool along a borehole, e.g., as a wireline tool or a LWD tool. In block 804, as the tool is being conveyed along the borehole, it measures the components of the apparent conductivity tensor as a function of the tool's position in the borehole. Tool calibration and temperature correction are normally applied during or shortly after the measurements are acquired. In at least some cases, the tool sonde further includes instruments to measure borehole diameter ($d_{hole}$) and borehole fluid resistivity $R_{hole}$. In block 806, the system preprocesses the conductivity tensor and borehole size logs. Such preprocessing can include adaptive low-pass filtering to remove high-frequency measurement noise and/or to correct for horn-effect at formation boundaries. In some cases, the boundary horns may be removed or reduced using the some combined logs as described in U.S. Pat. No. 6,819,112, titled "Method of combining vertical and horizontal magnetic dipole induction logs for reduced shoulder and borehole effects" by inventors Gianzero and Gao.

In block 808, the system inverts the tool measurements to obtain a first set of one or more formation parameter estimates based on a first formation model (such as the radial formation model described above). This first set of one or more formation parameter estimates may represent initial estimates of formation resistivity, dip, and strike, as a function of tool position. These initial estimates of formation resistivity, dip, and strike, can be employed in block 810 to tentatively identify boundaries between the beds. For example, regions of relatively steady parameter values may correspond to the same beds, while the in-between regions indicate boundaries. Other boundary detection methods are also known and may be used, such as using boundary horns in the raw data, etc.

In block 812, the system employs the tentative boundary identifications to select a processing window. The processing window has a specified width (e.g., two layers) above and below the current layer of interest. As processing proceeds from layer to layer, the processing window is progressively re-selected to maintain the layer of interest in the center.

In block 814, the system derives certain statistics from the first set of formation parameter estimates within the window. In at least some embodiments, the system calculates average dip and strike values, dip and strike variances, and an average anisotropy ratio.

$$\text{avg\_dip} = \frac{1}{N}\sum_{j=1}^{N} dip_j \tag{7a}$$

$$\text{var\_dip} = \frac{1}{N}\sum_{j=1}^{N} (dip_j - \text{avg\_dip})^2 \tag{7b}$$

$$\text{avg\_strike} = \frac{1}{N}\sum_{j=1}^{N} strike_j \tag{8a}$$

$$\text{var\_strike} = \frac{1}{N}\sum_{j=1}^{N} (strike_j - \text{avg\_strike})^2 \tag{8b}$$

$$\text{avg\_anisotropy ratio} = \frac{1}{N}\sum_{j=1}^{N} \frac{R_{v_j}}{R_{h_j}} \tag{9}$$

The foregoing calculations may be made over all the measurement points within the window, or over evenly-spaced points within the window. However, certain contemplated embodiments employ only the measurements taken at or near the center of each layer.

Note that in equations (7) and (8), there exists an inherent ambiguity due to the nature of angular measurements. The strike angles have an inherent modulo $2\pi$ ambiguity and the dip angles have an inherent modulo $\pi$ ambiguity. When performing these calculations, the systems minimize the effect of this ambiguity by positioning the angles within the same basal range and, inasmuch as possible, by positioning the boundaries of the basal range away from the measured values. As an alternative to the average anisotropy ratio in equation (9), the system may calculate the average of the anisotropy index defined in the background above.

In block 816, the system determines whether the statistics indicate that the inversion results derived from the first formation model in block 808 are adequate or whether the current layer of interest may represent a selected region where an inversion based on a second, different formation model (such as the vertical formation model) should be employed. In at least some embodiments, the system compares the average anisotropy ratio to a threshold and for values below the threshold, the system determines that the inversion based on the second formation model should be performed. (Some embodiments use a threshold value of about 1.2.) Alternatively, if the variances of the dip and strike are both less than respective thresholds chosen to distinguish a consistent orientation from a varying orientation, or if the variance of the dip is below the threshold and the average dip is small (e.g., less than 10°), the system determines that the inversion based on the second formation model should be performed. The latter test is employed because a wide variation in the estimated strike angle can be expected for small dip angles. Otherwise (i.e., for a large anisotropy coupled with a varying formation orientation), processing proceeds with block 818.

In block 818, the system checks the thickness of the current layer, in some embodiments by comparing it to a threshold value representative of the tool's resolution. In other embodiments, the system calculates the variances of Rh and Rv across measurements in the layer:

$$\text{var\_R}_h = \frac{1}{N}\sum_{j=1}^{N} \left( R_{h_j} - \frac{\sum_{j=1}^{N} R_{h_j}}{N} \right)^2 \tag{10a}$$

$$\text{var\_R}_v = \frac{1}{N}\sum_{j=1}^{N} \left( R_{v_j} - \frac{\sum_{j=1}^{N} R_{v_j}}{N} \right)^2 \tag{10b}$$

If both variances are below a predefined threshold value, the system determines that the layer is sufficiently thick.

For a sufficiently thick layer, the system accepts the first set of formation parameter estimates from block 808, and in block 820 the system stores the formation parameter estimates from this first set as part of a third set of formation parameter estimates which represent a final output for the current layer. In block 822, the system determines whether all of the layers have been processed. If not, the system returns to block 812 to increment the processing window. Otherwise the system displays a visual representation of the logs to a user in block 824, and the process completes. The logs displayed in block 824 may include, as a function of depth or position, formation parameter estimates such as horizontal resistivity, vertical resistivity, resistive anisotropy, dip angle, strike angle, and borehole diameter.

Returning to block 816, if the system determines that it should at least consider performing an inversion using a second formation model, the first set of formation parameter estimates is used in block 826 as a basis for specifying initial formation parameter estimates for the second formation model. (As previously mentioned, the second formation model may be a vertical formation model.) For example the bed boundaries from block 810 may be used to define the layers in the vertical formation model, with each layer having an estimated resistivity and anisotropy derived from measurements corresponding to the center of the layer, and with all layers sharing a common dip and strike derived from equations (7a) and (8a). During the inversion, each of these formation parameters, including the positions of the layer boundaries, may be varied.

In block 828, the system computes the synthetic response using the first and second formation models. For example, the system may compute the synthetic response of the radial formation model point-by-point across the processing window, and may compute the synthetic response of the vertical formation model across the processing window. That is, the system determines the tool measurements that would be made if each of the first and second formation models were correct.

In block 830, the system compares the responses across the thickness of the current layer to determine whether the current layer should be categorized as a selected region where a second set of one or more formation parameter estimates should be determined using a second formation model different from the first formation model. In one embodiment, the system determines the average error:

$$\text{diff\_response}_j = \left| \frac{\text{VertModelResponse}_j - \text{RadialModelResponse}_j}{\text{VertModelResponse}_j} \right| \quad (11a)$$

$$\text{avg\_error} = \frac{1}{N} \sum_{j=1}^{N} \text{diff\_response}_j \quad (11b)$$

If the average error falls below a predetermined threshold, in block 820 the current layer is not categorized as a selected region, and according the system stores the first set of formation parameter estimates as part of the final output represented by the third set of formation parameter estimates. Otherwise the current layer is categorized as a selected region and the system proceeds with an inversion based on the second formation model in block 832, adjusting the second set of formation parameter estimates as needed to achieve an adequate fit to the tool measurements. In block 834, the system calculates the third set of formation parameter estimates (representing the output estimates for the current layer) as a combination of the first and second sets of formation parameter estimates. In some embodiments, this combination takes the form $$\text{Final Result} = \alpha \text{VertModelResult} + (1-\alpha)\text{RadialModelResult} \quad (12)$$

where $\alpha$ is some function of the average error, i.e., $\alpha = F(\text{avg\_error})$. As an example, F can be a ramp function, a sigmoid function, a raised-cosine function, or any other function that provides a smooth transition from zero to one, initiating the transition at the predetermined threshold for performing the inversion based on the second formation model and ending the transition at a second predetermined threshold value. As an example, FIG. 9 shows a sigmoid-based transition function with the first threshold at 0.01 and the second threshold at 0.1. Different threshold values can be used for different subarrays and/or different frequencies, optimized based on the particular logging environment and expected results. The use of a ramp or other smoothing function serves to minimize discontinuities or "jumps" in the log when the system switches from one model to the other. The combined results are stored in block 820.

Returning to block 818, if the system determines that the layer is not sufficiently thick, i.e., that there exists a significant shoulder bed effect for the current layer, processing proceeds with block 836. In block 836, as in block 826, the system creates a second formation model (e.g., a vertical formation model) based on the initial formation parameter estimates represented by the first set. In block 838, as in block 828, the system computes the synthetic responses for both first and second formation models. In block 840, the difference between the responses across the thickness of the current layer is determined (equation 11a) and used as an estimate of the shoulder bed effect. The difference is subtracted from the measured response in block 840.

$$\text{Corrected\_response}_j = \text{MeasuredResponse}_j - \gamma(\text{VertModelResponse}_j - \text{RadialModelResponse}_j) \quad (13)$$

where the constant $\gamma$ can vary from 0 (no correction) to 1 (full correction). Different values for the constant can be used for different subarrays and/or frequencies and they can be optimized based on the particular logging environment and expected results. A good default value is 0.95.

In block 842, the system performs an inversion of the corrected response using the first formation model (e.g., the radial formation model) to obtain a fourth set of formation parameter estimates representing refined parameter estimates for the current layer of interest. Some embodiments may employ these refined parameter estimates as the third set of formation parameter estimates representing the output estimates for the current layer, while other embodiments may obtain the third set of formation parameter estimates by combining the refined estimates with the first set of formation parameter estimates as provided in equation 12 above. In block 820, the system stores the third set of formation parameter estimates. Thus, the third set of formation parameter estimates displayed as logs in block 824 employs the first set of formation parameter estimates (e.g., the initial radial formation model-based inversion estimates) where appropriate, the second set of formation parameter estimates (e.g., the vertical formation model-based inversion estimates) where appropriate, and where necessary, a fourth set of formation parameter estimates (e.g., the refined parameter estimates derived from a radial model-based inversion of a vertical model-corrected response).

FIG. 10 is a block diagram of an illustrative processing system 900 (e.g., processing system 50). In accordance with an embodiment, the processing system 900: derives, from multi-component transmitter-receiver coupling measurements obtained by a logging tool conveyed along a borehole through a formation, a first set of one or more formation parameter estimates based on a first formation model; derives in one or more selected regions a second set of one or more formation parameter estimates based on a second formation model different from the first formation model; produces a third set of one or more formation parameter estimates based at least in part on the first and second sets, each formation parameter estimate in the first, second, and third sets being determined as a function of position along the borehole; and displays a visual representation of at least one formation parameter estimate from the third set, wherein each formation parameter estimate in the third set depends on a corresponding formation parameter estimate from the second set in the one or more selected regions, and wherein each formation parameter estimate in the third set depends only on a corresponding formation parameter estimate from the first set in one or more regions outside the one or more selected regions.

Embodiments disclosed herein include:

A: A logging method that comprises obtaining multi-component transmitter-receiver coupling measurements from a logging tool conveyed along a borehole through a formation, deriving from said measurements a first set of one or more formation parameter estimates based on a first formation model, deriving in one or more selected regions a second set of one or more formation parameter estimates based on a second formation model different from the first formation model, producing a third set of one or more formation parameter estimates based at least in part on the first and second sets, each formation parameter estimate in the first, second, and third sets being determined as a function of position along the borehole, and displaying a visual representation of at least one formation parameter estimate from the third set, wherein each formation parameter estimate in the third set depends on a corresponding formation parameter estimate from the second set in the one or more selected regions, and wherein each formation parameter estimate in the third set depends only on a corresponding formation parameter estimate from the first set in one or more regions outside the one or more selected regions.

B: A logging system that comprises a logging tool that when conveyed along a borehole through a formation obtains multi-component transmitter-receiver coupling measurements and a processing system that derives from said measurements a first set of one or more formation parameter estimates based on a first formation model, derives in one or more selected regions a second set of one or more formation parameter estimates based on a second formation model different from the first formation model, produces a third set of one or more formation parameter estimates based at least in part on the first and second sets, each formation parameter estimate in the first, second, and third sets being determined as a function of position along the borehole, and displays a visual representation of at least one formation parameter estimate from the third set, wherein each formation parameter estimate in the third set depends on a corresponding formation parameter estimate from the second set in the one or more selected regions, and wherein each formation parameter estimate in the third set depends only on a corresponding formation parameter estimate from the first set in one or more regions outside the one or more selected regions.

Each of the embodiments A and B may have one or more of the following additional elements in any combination: Element 1: further comprising using the first set of formation parameter estimates to determine within a sliding window each of: an average dip angle, a dip angle variance, and a strike angle variance, and identifying as selected regions those sliding window positions having a dip angle variance below a first predetermined threshold, coupled with a strike angle variance below a second predetermined threshold or an average dip angle below a third predetermined threshold. Element 2: wherein said using further includes determining within the sliding window an average anisotropy, and wherein the selected regions further include those sliding window positions having an average anisotropy below a fourth predetermined threshold. Element 3: further comprising calculating across a thickness of a given layer a variance of a formation resistivity estimate, and identifying selected layers having a resistivity variance above a fifth predetermined threshold, wherein in the selected layers, the formation parameter estimates in the third set depend on formation parameter estimates derived from shoulder bed effect corrected coupling measurements. Element 4: wherein the first formation model provides a homogeneous anisotropic dipping formation that is otherwise radially symmetry about an axis of the borehole. Element 5: wherein the second formation model provides multiple anisotropic dipping formation beds having boundaries derived from the first set of formation parameter estimates. Element 6: wherein each formation parameter estimate in the third set depends on corresponding formation parameter estimates from the first and second sets in the selected regions. Element 7: wherein in the selected regions, each formation parameter estimate in the third set is a weighted combination of the corresponding formation parameter estimates from the first and second sets. Element 8: wherein the weighted combination employs a weighting that is dependent upon a difference in tool response to the two formation models. Element 9: wherein each set includes estimates for formation dip and strike angles. Element 10: wherein each set includes estimates for at least two parameters in a set consisting of horizontal resistivity, vertical resistivity, and resistive anisotropy.

Element 11: wherein the processing system further uses the first set of formation parameter estimates to determine within a sliding window each of: an average dip angle, a dip angle variance, and a strike angle variance, and identifies as selected regions those sliding window positions having a dip angle variance below a first predetermined threshold, coupled with a strike angle variance below a second predetermined threshold or an average dip angle below a third predetermined threshold. Element 12: wherein as part of said using, the processing system further determines within the sliding window an average anisotropy, and wherein the selected regions further include those sliding window positions having an average anisotropy below a fourth predetermined threshold. Element 13: wherein the processing system further calculates across a thickness of a given layer a variance of a formation resistivity estimate, and identifies selected layers having a resistivity variance above a fifth predetermined threshold, wherein in the selected layers, the formation parameter estimates in the third set depend on formation parameter estimates derived from shoulder bed effect corrected coupling measurements. Element 14: wherein the first formation model provides a homogeneous anisotropic dipping formation that is otherwise radially symmetry about an axis of the borehole. Element 15: wherein the second formation model provides multiple anisotropic dipping formation beds having boundaries derived from the first set of formation parameter estimates. Element 16: wherein each formation parameter estimate in the third set depends on corresponding formation parameter estimates from the first and second sets in the selected regions. Element 17: wherein in the selected regions, each formation parameter estimate in the third set is a weighted combination of the corresponding formation parameter estimates from the first and second sets. Element 18: wherein the weighted combination employs a weighting that is dependent upon a difference in tool response to the two formation models. Element 19: wherein each set includes estimates for formation dip and strike angles. Element 20: wherein each set includes estimates for at least two parameters in a set consisting of horizontal resistivity, vertical resistivity, and resistive anisotropy.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:
1. A method that comprises:
   disposing a logging tool into a borehole, wherein the logging tool comprises a transmitter and at least one receiver spaced from the transmitter, and wherein transmitter comprises:
      a winding form, wherein the winding form encircles an inner tubular;
      at least one coil disposed on an x-axis of the winding form, a y-axis of the winding form, and a z-axis of the winding form;
   firing a signal from the transmitter at a frequency into a formation;
   measuring the signal with the at least one receiver to form a multi-component transmitter receiver coupling measurement;
   deriving, by at least one processor, from said measurements a first set of one or more formation parameter estimates based on a first formation model;

using the first set of formation parameter estimates to determine within a sliding window each of: an average dip angle, a dip angle variance, and a strike angle variance; and identifying as selected formation regions those sliding window positions having a dip angle variance below a first predetermined threshold, coupled with a strike angle variance below a second predetermined threshold or an average dip angle below a third predetermined threshold;

deriving in response to an error or variance analysis of the first set of formation parameter estimates, by the at least one processor, a second set of one or more formation parameter estimates for one or more selected formation regions, wherein said deriving the second set of one or more formation parameter estimates is based on a second formation model different from the first formation model;

producing, by the at least one processor, a third set of one or more formation parameter estimates based at least in part on the first and second sets, each formation parameter estimate in the first, second, and third sets being determined as a function of position along the borehole; and displaying, by a display device, a visual representation of at least one formation parameter estimate from the third set as formation logs having multiple tracks each displaying a formation parameter's dependence on depth or borehole position, wherein each formation parameter estimate in the third set depends on a corresponding formation parameter estimate from the second set for the one or more selected formation regions, wherein each formation parameter estimate in the third set depends only on a corresponding formation parameter estimate from the first set for one or more formation regions outside the one or more selected formation regions, and wherein each of the first, second, and third sets of one or more formation parameter estimates includes a resistivity estimate.

2. The method of claim 1, wherein said using further includes determining within the sliding window an average anisotropy, and wherein the selected formation regions further include those sliding window positions having an average anisotropy below a fourth predetermined threshold.

3. The method of claim 2, further comprising:
calculating across a thickness of a given layer a variance of a formation resistivity estimate; and
identifying selected layers having a resistivity variance above a fifth predetermined threshold, wherein, in the selected layers, the formation parameter estimates in the third set depend on formation parameter estimates derived from shoulder bed effect corrected coupling measurements.

4. The method of claim 1, wherein the first formation model provides a homogeneous anisotropic dipping formation that is otherwise radially symmetry about an axis of the borehole.

5. The method of claim 1, wherein the second formation model provides multiple anisotropic dipping formation beds having boundaries derived from the first set of formation parameter estimates.

6. The method of claim 1, wherein each formation parameter estimate in the third set depends on corresponding formation parameter estimates from the first and second sets corresponding to the selected formation regions.

7. The method of claim 6, wherein for the selected formation regions, each formation parameter estimate in the third set is a weighted combination of the corresponding formation parameter estimates from the first and second sets.

8. The method of claim 7, wherein the weighted combination employs a weighting that is dependent upon a difference in tool response to the two formation models.

9. The method of claim 1, wherein each set includes estimates for formation dip and strike angles.

10. The method of claim 1, wherein the logging tool further comprises a midpoint between the transmitter and the at least one receiver and wherein the transmitter is about 0.4 meter to about 10 meters from the midpoint and the at least one receiver is about 0.4 meter to about 10 meters from the midpoint and further wherein each set includes estimates for at least two parameters in a set consisting of horizontal resistivity, vertical resistivity, and resistive anisotropy.

11. A system that comprises:
a logging tool comprising a transmitter and at least one receiver, wherein the transmitter comprises:
a winding form, wherein the winding form encircles an inner tubular;
at least one coil disposed on an x-axis of the winding form, a y-axis of the winding form, and a z-axis of the winding form; and wherein the transmitter is configured to fire a signal from at a frequency into a formation, and the at least one receiver is configured to measure the signal with the at least one receiver to form a multi-component transmitter receiver coupling measurement;
a processing system that:
derives from said measurements a first set of one or more formation parameter estimates based on a first formation model;
uses the first set of formation parameter estimates to determine within a sliding window each of: an average dip angle, a dip angle variance, and a strike angle variance; and
identifies as selected formation regions those sliding window positions having a dip angle variance below a first predetermined threshold, coupled with a strike angle variance below a second predetermined threshold or an average dip angle below a third predetermined threshold;
derives, in response to an error or variance analysis of the first set of formation parameter estimates, a second set of one or more formation parameter estimates for one or more selected formation regions, wherein said deriving the second set of one or more formation parameter estimates is based on a second formation model different from the first formation model;
produces a third set of one or more formation parameter estimates based at least in part on the first and second sets, each formation parameter estimate in the first, second, and third sets being determined as a function of position along the borehole; and
a display device that displays a visual representation of at least one formation parameter estimate from the third set as formation logs having multiple tracks each displaying a formation parameter's dependence on depth or borehole position,
wherein each formation parameter estimate in the third set depends on a corresponding formation parameter estimate from the second set corresponding to_the one or more selected formation regions, wherein each formation parameter estimate in the third set depends only on a corresponding formation parameter estimate from the first set corresponding to one or more formation regions outside the one or more selected formation regions, and wherein each of the first, second, and third sets of one or more formation parameter estimates includes a resistivity estimate.

12. The logging system of claim 11, wherein as part of said using, the processing system further determines within the sliding window an average anisotropy, and wherein the selected formation regions further include those sliding window positions having an average anisotropy below a fourth predetermined threshold.

13. The logging system of claim 12, wherein the processing system further:
   calculates across a thickness of a given layer a variance of a formation resistivity estimate; and
   identifies selected layers having a resistivity variance above a fifth predetermined threshold, wherein, in the selected layers, the formation parameter estimates in the third set depend on formation parameter estimates derived from shoulder bed effect corrected coupling measurements.

14. The logging system of claim 11, wherein the first formation model provides a homogeneous anisotropic dipping formation that is otherwise radially symmetry about an axis of the borehole.

15. The logging system of claim 11, wherein the second formation model provides multiple anisotropic dipping formation beds having boundaries derived from the first set of formation parameter estimates.

16. The logging system of claim 11, wherein each formation parameter estimate in the third set depends on corresponding formation parameter estimates from the first and second sets corresponding to the selected formation regions.

17. The logging system of claim 16, wherein in the selected formation regions, each formation parameter estimate in the third set is a weighted combination of the corresponding formation parameter estimates from the first and second sets.

18. The logging system of claim 17, wherein the weighted combination employs a weighting that is dependent upon a difference in tool response to the two formation models.

19. The logging system of claim 11, wherein each set includes estimates for formation dip and strike angles.

20. The logging system of claim 11, wherein each set includes estimates for at least two parameters in a set consisting of horizontal resistivity, vertical resistivity, and resistive anisotropy.

21. The logging system of claim 11, further comprising a midpoint between the transmitter and the at least one receiver and wherein the transmitter is about 0.4 meter to about 10 meters from the midpoint and the at least one receiver is about 0.4 meter to about 10 meters from the midpoint.

* * * * *